United States Patent [19]

Copsey et al.

[11] Patent Number: 5,507,999
[45] Date of Patent: Apr. 16, 1996

[54] PROCESS FOR THERMOFORMING PLASTIC DOORS

[75] Inventors: Clive J. Copsey, Avon Lake; Gerard J. Barthelemy, Spencer; Martin T. Chernock, Avon Lake, all of Ohio

[73] Assignee: The Geon Company, Avon Lake, Ohio

[21] Appl. No.: 228,063

[22] Filed: Apr. 15, 1994

Related U.S. Application Data

[63] Continuation-in-part of Ser. No. 967,010, Oct. 27, 1992, abandoned.

[51] Int. Cl.$^6$ .............................. B29C 51/04; B29C 51/10
[52] U.S. Cl. .............................................. 264/545; 425/388
[58] Field of Search .................................. 264/545, 547, 264/548, 554; 425/384, 388; 156/292

[56] References Cited

U.S. PATENT DOCUMENTS

| | | | |
|---|---|---|---|
| 1,535,354 | 4/1925 | Steele et al. | 264/545 |
| 2,670,501 | 3/1954 | Michiels | 264/545 |
| 3,362,045 | 1/1968 | Jones-Hinton et al. | 425/388 |
| 3,450,807 | 6/1969 | Cheney | 425/388 |
| 3,736,201 | 5/1973 | Teraoka | 254/545 |
| 3,767,740 | 10/1973 | Jones-Hinton et al. | 264/545 |
| 3,854,860 | 12/1974 | Haag | 264/545 |
| 4,427,476 | 1/1984 | Beck et al. | 264/545 |
| 4,546,899 | 10/1985 | Williams | 264/516 |
| 5,108,529 | 4/1992 | Shuert | 264/545 |
| 5,168,621 | 12/1992 | Kruck et al. | 264/545 |
| 5,391,251 | 2/1995 | Shuert | 264/545 |

FOREIGN PATENT DOCUMENTS

| | | | |
|---|---|---|---|
| 2256945 | 11/1972 | Germany | 264/545 |
| 2202000 | 8/1973 | Germany | 264/545 |
| 49-043710 | 11/1974 | Japan | 264/545 |
| 53-040067 | 4/1978 | Japan | 264/545 |

OTHER PUBLICATIONS

Modern Plastics, Date Unknown, pp. 124–125.

*Primary Examiner*—Catherine Timm
*Attorney, Agent, or Firm*—Joseph Januskiewicz; Miles B. Dearth

[57] ABSTRACT

The method of molding a refrigerator door by preheating a pair of plastic sheets and thence placing the first sheet and the second sheet on a lower female mold and on a plug assist female mold, respectively. The preheated sheet in the lower mold has a full vacuum drawn thereon to mold such first sheet into the final form of the front door panel. A partial vacuum is drawn on the second sheet to partially form the plastic sheet into the configuration of the final form of the inner door panel and thence the preformed second sheet is transferred to an upper male mold by drawing a full vacuum on the upper mold to effect such transfer and molding to a finished inner door configuration. The two panels thence have their outer perimeters fusion bonded to form a closed chamber that is filled with foam insulation after cooling of the formed and joined door panels.

3 Claims, 10 Drawing Sheets

PROCESS FOR THERMOFORMING PLASTIC DOORS

This is a continuation-in-part of prior application Ser. No. 07/967,010 filed on Oct. 27, 1992, now abandoned.

BACKGROUND OF THE INVENTION

This invention relates to the method or process of thermoforming plastic materials into a finished product with a closed chamber therein and more particularly to a new and improved method of making a plastic product having thin cross-sectioned walls that are cooperative to define a closed cavity or chamber such as a refrigerator door.

There has been a substantial growth worldwide in the plastics industry directed to the production of articles for use in the home and commerce. The techniques used in such development include blow molding, injection molding and thermoform molding. In the manufacture of such products as refrigerator doors, very little has been done to mold plastic doors because of the inherent difficulty of forming a closed chambered product. U.S. Pat. No. 4,862,577 discloses a method of manufacturing a refrigerator cabinet's outer shell by the use of heat-curable adhesives and brackets with its accompanying hardware which involves considerable hand labor. The Gould patent (U.S. Pat. No. 2,976,577) is directed to the process of making a foamed core refrigerator door in one step by the use of two opposing flat thermoplastic sheets in mold sections and adding foam forming material to the lower portion of the mold which holds the lower plastic sheets and thence on closing the mold sections utilizing the foam material through exothermic heat and pressure generated during the molding process to form the desired contoured shape to the opposed plastic sheets while simultaneously filling the central cavity with foam. This process from a practical standpoint has the limitation that the same pressure or force is applied to all surfaces which cause an immediate stretching of the material and causes a pronounced thinness at the initial areas which in applicant's case would be detrimental to a proper distribution of the plastic material. Further, such process without preheating is not feasible for most plastic materials. In applicant's process, separate stages and forces are used in the formation process which is particularly important in the molding of the inner liner of a product like a refrigerator door which has a configuration to include separate protruding abutments which requires greater control of the flow of plastic material which affects the cross-sectional thickness of the door liner. In this process applicant uses a female plug mold to initially assist in the formation of the article while distributing the plastic sheet in a manner to assure proper thickness in the necessary areas which is done in cooperation with a male mold which then applies a negative pressure to complete the molding process and finishes the distribution of the plastic material. This action is then followed by the cooperative action of a female mold and a male mold which finishes the molding of the completed door in one complete cycle thereby eliminating the many labor intensive steps that are currently being used to assemble the panels by hand. By this process, the distribution of the sheet material during the thermoforming process enhances the structural integrity of the two panels or plastic sheets since it is able to control the stretch and distribution of the flowable material in a direction to enhance the strength and rigidity of the protruding members or abutments.

SUMMARY OF THE INVENTION

The present invention is directed to a method for fabricating a refrigerator door by preheating two separate plastic sheets which are then placed onto a lower female mold and an upper female plug mold. A partial vacuum is drawn on the sheet on the upper female plug mold to partially form the sheet into the general configuration of the male mold and the final form of the door panel. The partially formed inner door panel is transferred to an upper male mold by pulling a full vacuum thereon which final forms the inner door panel. The sheet on the lower mold is final formed into a front door panel by pulling a full vacuum thereon. These panels are then brought together to fusion bond the outer perimeters and form a closed chamber. After cooling the panels, the closed chamber is filled with insulation by injecting foam therein.

DESCRIPTION OF THE PREFERRED EMBODIMENT

Figure 1:
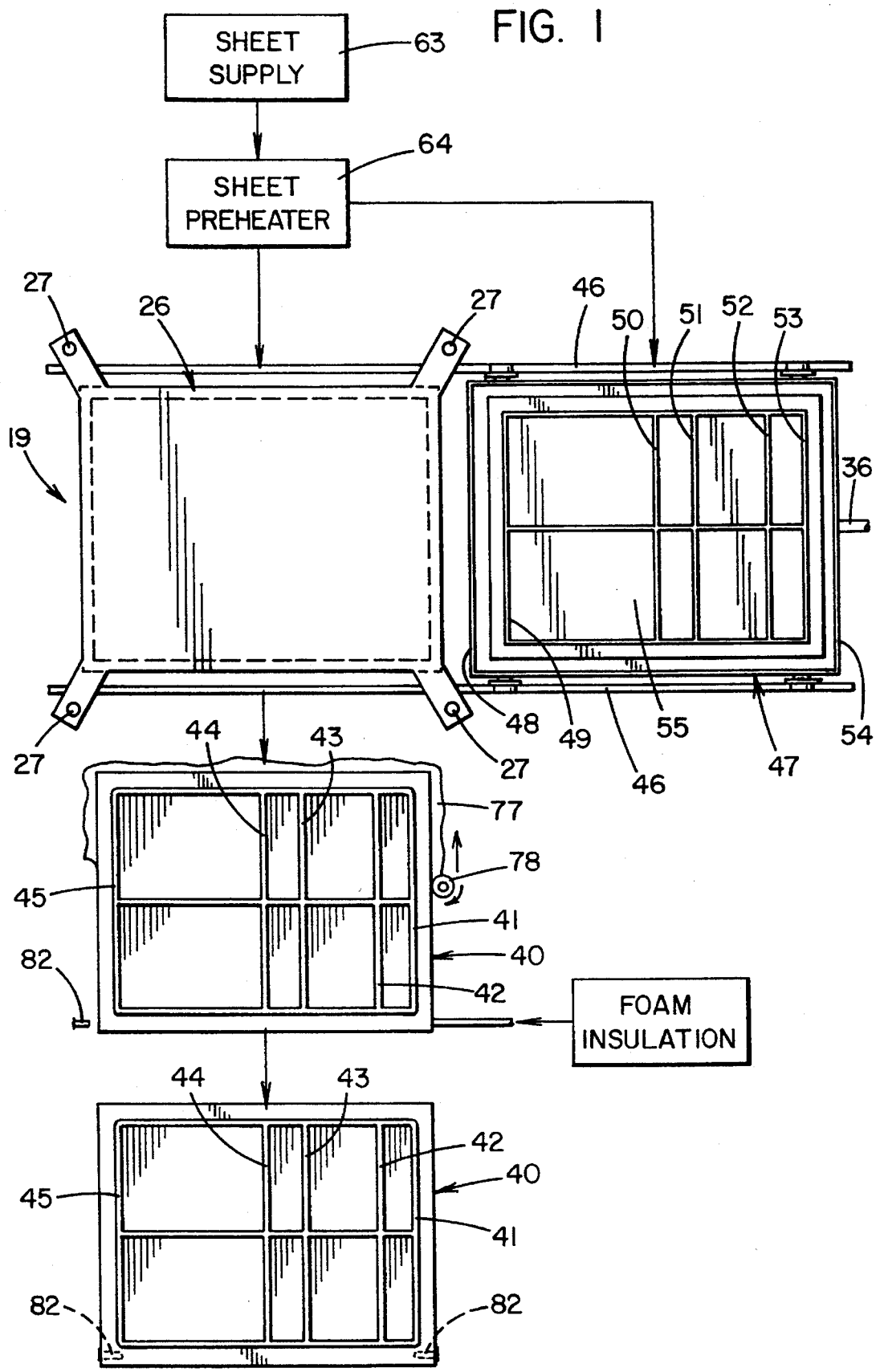
FIG. 1 is a schematic plan view of the flow diagram of the molding of a refrigerator door.
Figure 2:
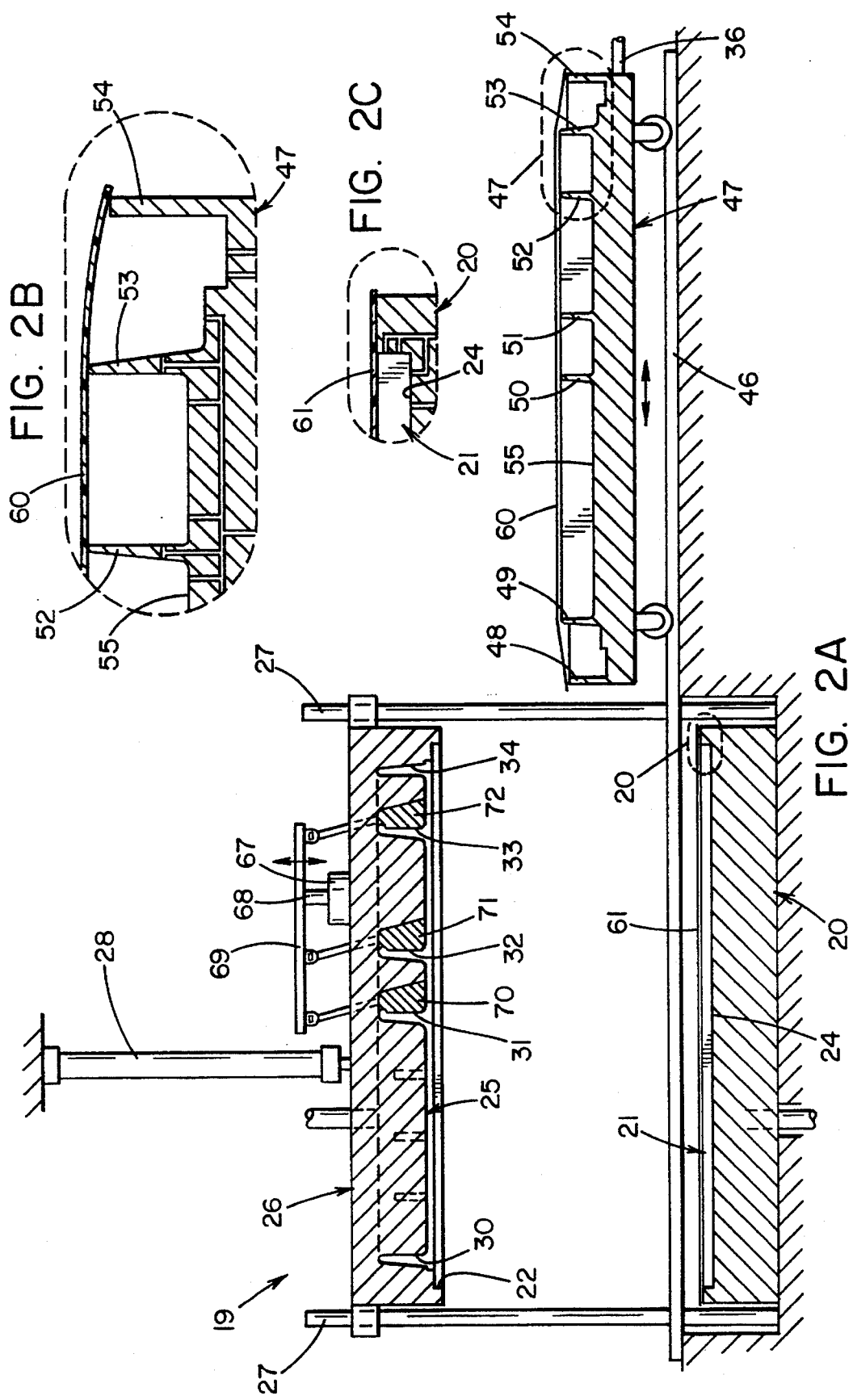
FIG. 2A is a diagrammatic side elevational view of the molding apparatus with three molds in cross section.
FIG. 2B is a cross sectional view of a corner portion of the female plug mold taken from FIG. 2A.
FIG. 2C is a cross sectional view of a corner portion of the lower female mold taken from FIG. 2A.

Referring now to the drawings, wherein like reference numerals designate like or corresponding parts throughout the several views, there is shown in FIGS. 2A through 6A a lower female mold or mold section 20 with a cavity 21. The mold or mold section 20 is suitably heated and provided with passages for the pulling of a vacuum as is old and well known in the art. The mold 20 is mounted on a suitable stationary base and has its inner surface cavity 24 shaped to produce the outer surface of a refrigerator door or the outer surface of any desired product.

An upper male mold or mold section 26 is movably mounted on guide bars 27 for selective movement into mating engagement with the lower mold 20 as powered by power means 28 such as hydraulic cylinder and piston shown schematically in FIG. 2A. Upper mold 26 has a central cavity 22 with an inner surface or contour 25 with a plurality of deep cavities designated 30 through 34 (in FIG. 2A) as well as other unnumbered cavities to form the inner surface of a refrigerator door designated 40 in FIG. 10 with a plurality of longitudinally spaced ribs 41 through 45 wherein ribs 41 and 45 are the upper and lower perimeters of the door. The number of ribs is an arbitrary designation and the number and direction may be varied. Such inner surface of mold 26 may be shaped to form any desired product or article. The mold 26 is suitably heated and provided with suitable passages for the pulling of a vacuum on a plastic sheet covering such inner surface 25. The molding apparatus containing upper mold 26 and lower mold 20 is designated 19 in FIGS. 1 and 2A.

A pair of laterally spaced rails 46 lead from a location adjacent to the lower mold 20 into the area between the upper male mold 26 and the lower female mold 20. Such rails 46 are sufficiently laterally spaced to permit the mating of upper mold 26 with lower mold 20. A female mold or female plug assist mold 47 is mounted on rails 46 and has a plurality of projections or ribs 48 through 54, with ribs 48 and 54 defining the outer perimeter of the mold 47 along with unnumbered side ribs. The surface area between the ribs is designated as 55. The respective ribs 49 through 53 of the female plug mold 47 are sized and oriented for advancement into the central cavity 22 of the upper male mold 26 with the respective ribs 49 through 53 operating to assist in the initial formation of the ribs 42, 43 and 44 on the inner surface of the refrigerator door only, as the final forming of the ribs 42, 43 and 44 as well as the shaping onto the inner surface of the upper mold 26 is achieved by the pulling of a full vacuum by the passages in the upper mold 26 to fully conform the preheated sheet to the full configuration of the mold. The plug assist mold 47 is made from syntactic foam which is an excellent insulator for retaining the heat in the plastic sheet positioned onto plug assist mold 47. Plug assist mold 47 is reciprocated into position for cooperative interaction with mold 26 by a hydraulic unit having a piston rod 36 as shown in FIG. 2A.

In the process for thermoforming a refrigerator door, a pair of plastic sheets 60 and 61 are moved from a supply pile 63 to a preheated 64, where such plastic sheets are heated to approximately 380° F. (193.3° C.). This temperature used to heat plastic sheets is dependent upon the material used. The flat first plastic preheated sheet 60 is transferred to female plug assist mold 47 and laid across the top of the mold as depicted by FIG. 2A while the second plastic preheated sheet 61 is transferred onto the lower mold 20. The female plug assist mold 47 is preheated to at least 220° F. (104.4° C). A negative pressure or vacuum is drawn into the cavity 21 of the lower mold 20 to draw and stretch the preheated sheet 61 firmly into the mold to form the front panel of the door, which preformed panel is designated 61A in FIG. 3A. This drawing of a full vacuum fully conforms the sheet to the full configuration of the lower female mold 20. Simultaneously with this action a partial vacuum is drawn in the cavity of the preheated female plug assist mold 47 to partially draw and stretch the preheated plastic sheet 60 from the flat horizontal position shown in FIGS. 2A and 2B to the position and form 60A shown in FIG. 3A. By definition throughout this specification the meaning of a full vacuum shall mean the pulling of a vacuum force on a material covering a mold is of such a value that the material conforms to the full configuration of the mold wherein the material contacts all surfaces of the mold, whereas the pulling of a partial vacuum means the pulling of a force within a mold on the material stretched over a mold that causes the material to only partially conform to the configuration of the mold i.e. a certain one portion of the mold does have the material in contact with its surface while the remaining portion of the mold does not have the material in contact with its surface.

It is to be further understood that when a partial vacuum is pulled, that portion of the mold closest to the material will come in contact with the material first and the degree of progression of coverage of the material onto the mold depends on the degree of partial vacuum pulled but in all cases a partial vacuum pulled indicates that only partial contact with the mold surfaces is made. Thus partial in all instances of use designates less than the whole part. As illustrated in FIGS. 3B and 3C the preheated plastic sheet 60 contacts the outermost portions of the respective ribs 49 through 53 without conforming to the shape of the mold. The degree of conformance to the outer portions of the ribs is controlled by the degree of partial vacuum formed, thus maintaining a greater thickness of the plastic sheet 60 along these contacted surfaces of the ribs while drawing out and reducing the thickness of that portion of the plastic sheet 60 that does not contact the surfaces of the ribs 49 through 53.

Figure 3:
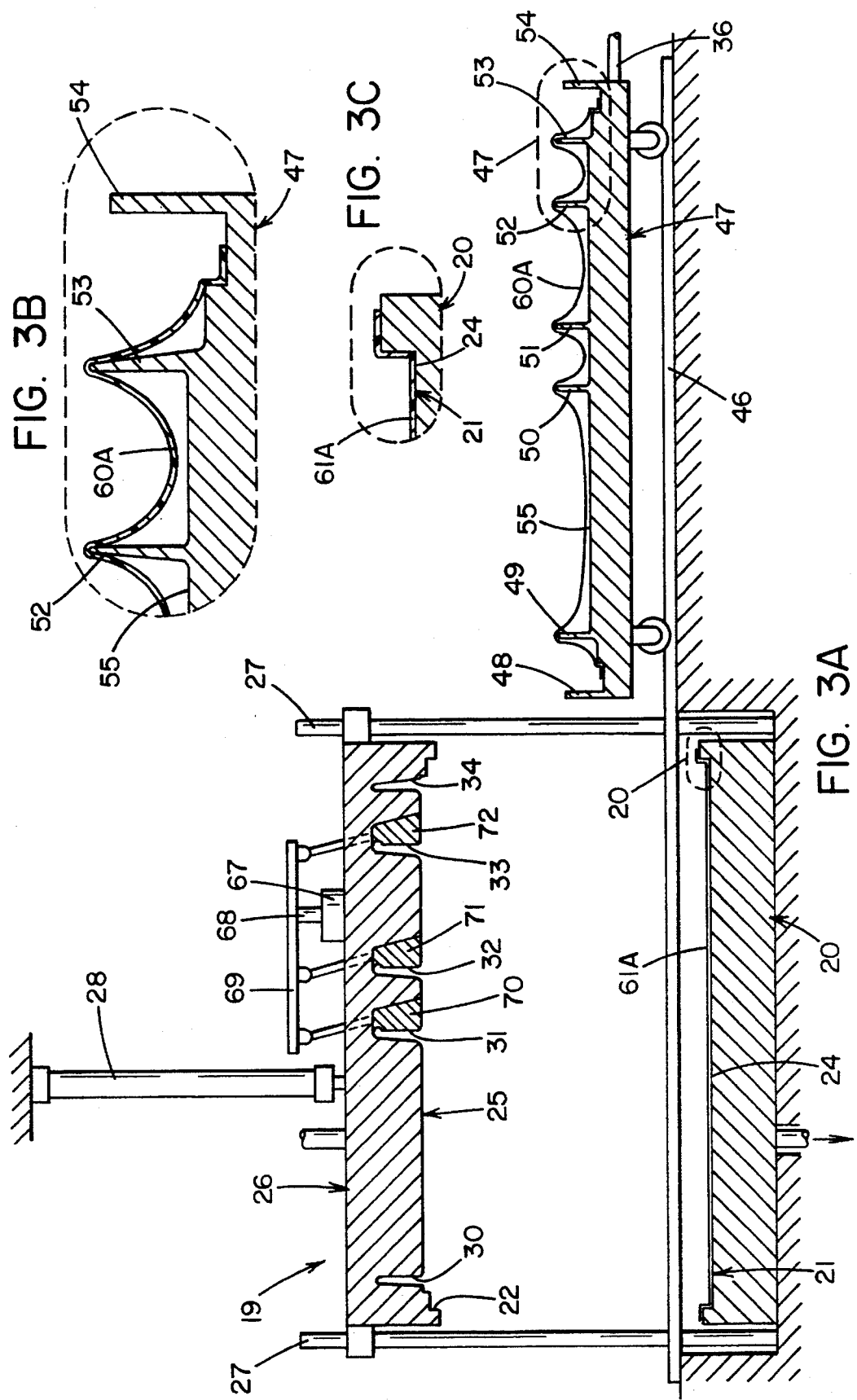
FIG. 3A is a diagrammatic side elevational view of the molding apparatus with the two of the three molds (in cross section) forming two separate plastic sheets.
FIG. 3B is a cross sectional view of a corner portion of the female plug mold taken from FIG. 3A.
FIG. 3C is a cross sectional view of a corner portion of the lower female mold taken from FIG. 3A.
Figure 4:
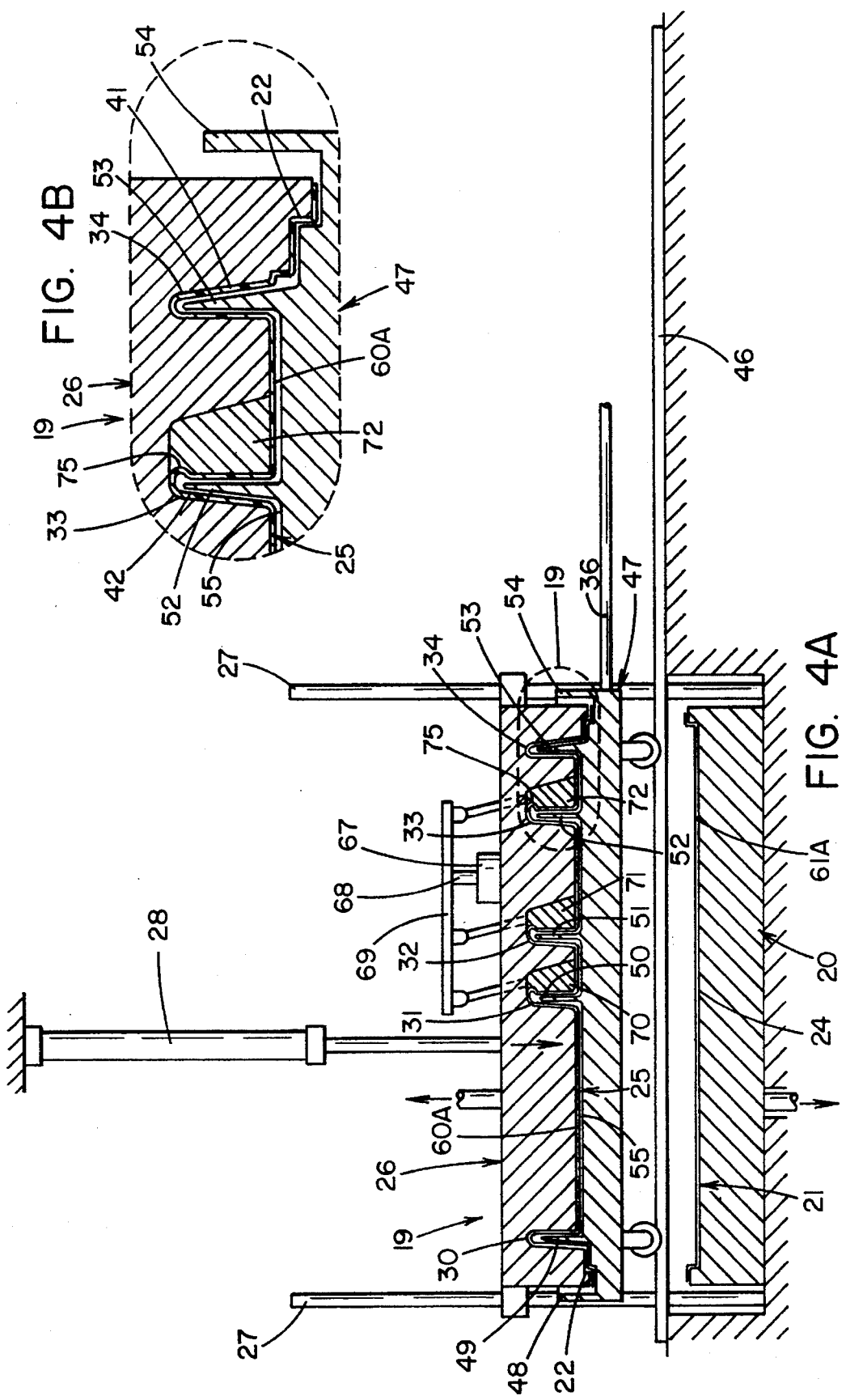
FIG. 4A is a diagrammatic side elevational view of the molding apparatus showing the transfer of the one preformed plastic sheet from the female plug mold to the top male mold and with the three molds in cross section.
FIG. 4B is a cross sectional view of a corner portion of the top male mold and female plug mold taken from FIG. 4A.
Figure 5:
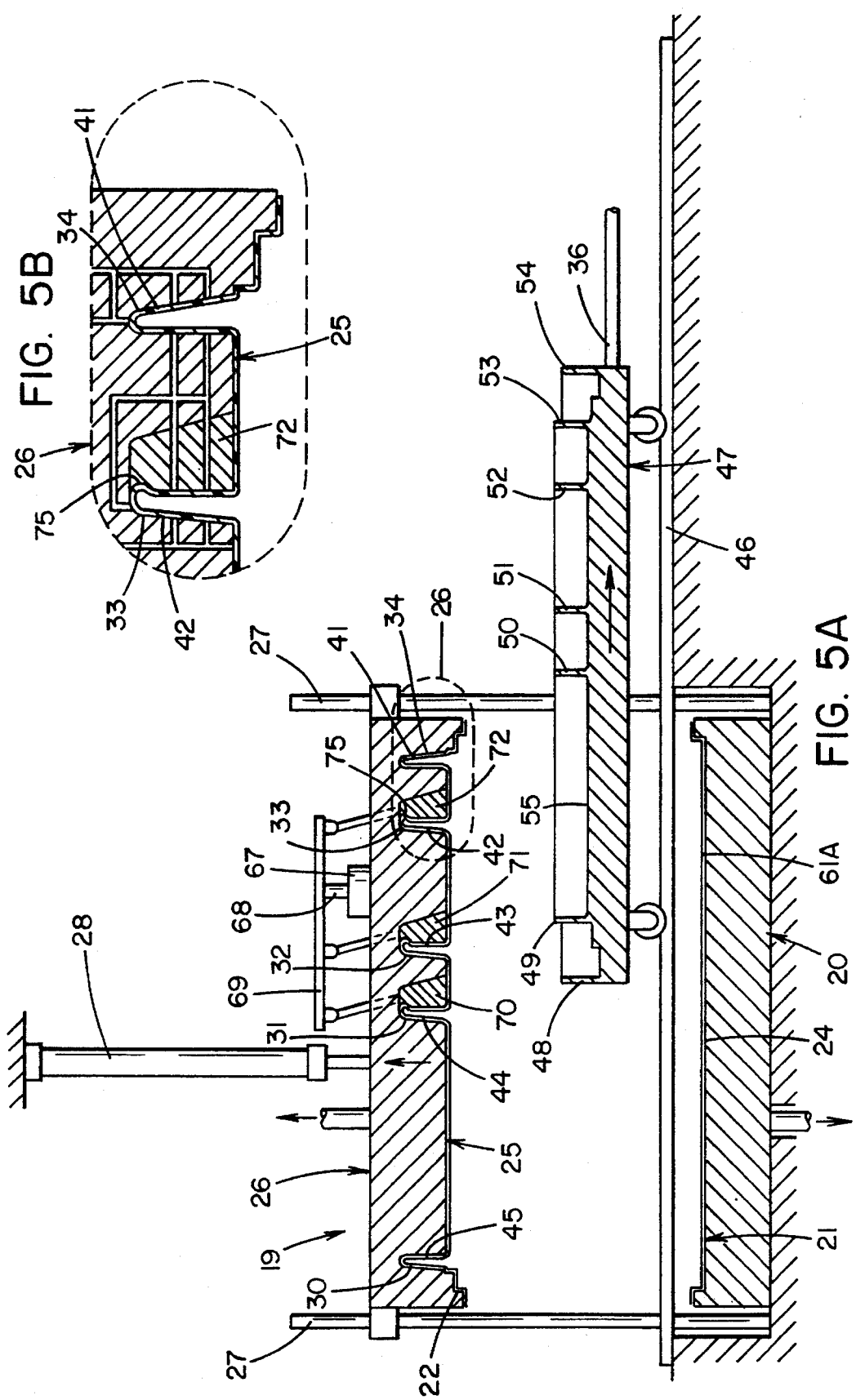
FIG. 5A is a diagrammatic side elevational view of the molding apparatus with the two plastic sheets in the respective female molds (in cross section) and the plug mold (in cross section) being moved out of the work area.
FIG. 5B is a cross section view of a corner portion of the top male mold taken from FIG. 5A.
Figure 6:
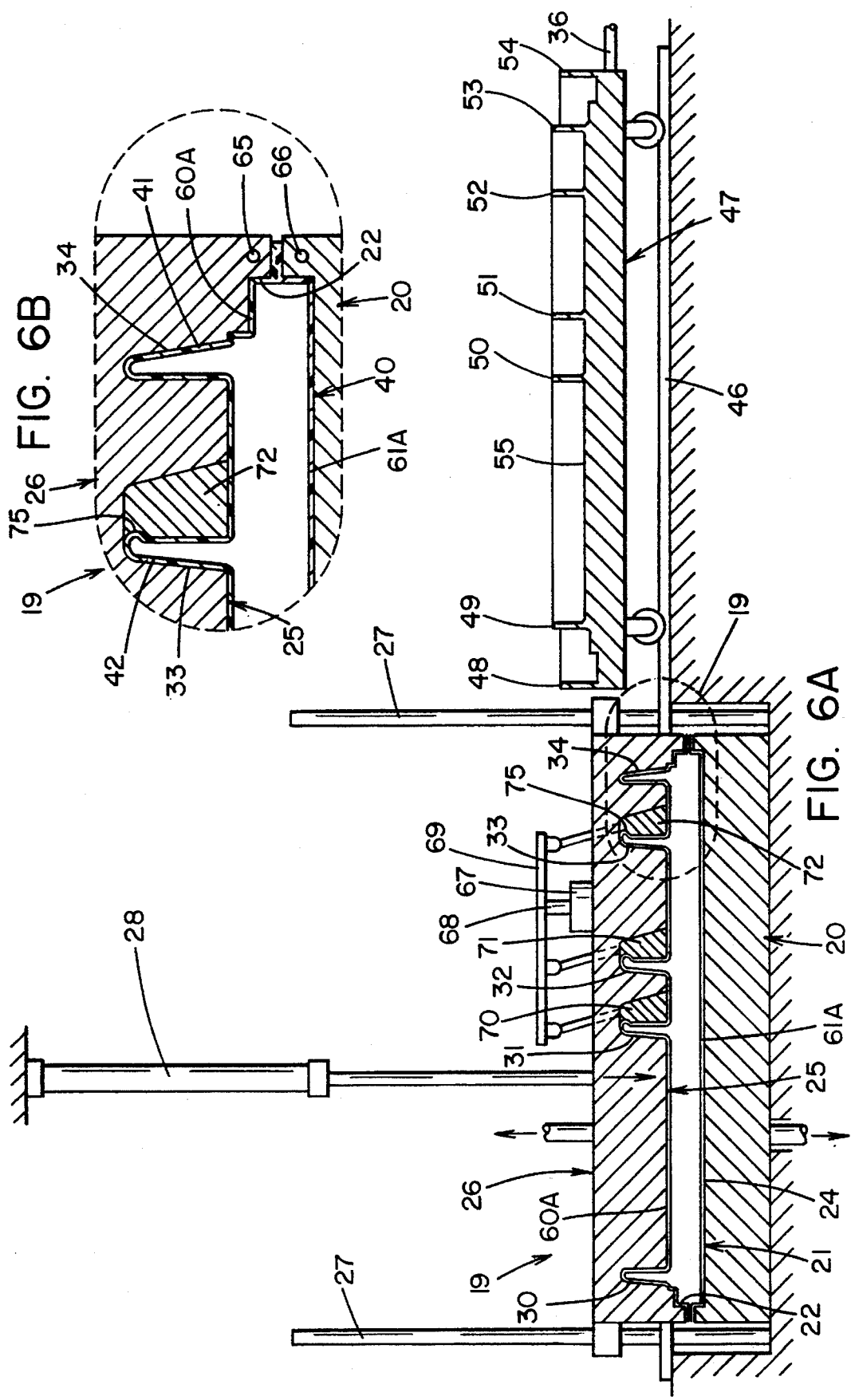
FIG. 6A is a diagrammatic side elevational view of the molding apparatus showing the final formation of a refrigerator door by the two molds.
FIG. 6B is a cross sectional view of a corner portion of the molding apparatus taken from FIG. 6A.

Plug assist mold 47 is then moved via rails 46 into a position directly below mold 26 and mold 26 is then lowered via power means 28 so that the cavities 30 through 34 are closely adjacent to the ribs 48 through 54 with a full vacuum being drawn through the various passageways in mold 26 as depicted schematically in FIG. 5B, thereby transferring the preformed sheet 60A to the male mold 26 where sheet 60A fully conforms to the configuration of mold 26. By initially using the female plug assist mold 47 to preform the preheated plastic sheet 60, where a partial vacuum is pulled, there is a partial distribution and stretching of the plastic sheet with the respective outermost portions of the ribs 49 through 53 contacting the plastic sheet (as depicted by FIGS. 3A and 3B) and retaining a greater thickness to the plastic sheet along these ribs. Then as the full vacuum is drawn in the respective cavities 30 through 34 (as well as the unnumbered cavities depicted in FIGS. 2A through 5A of mold 26), the plastic sheet 60 is completed in its stretching to a uniform thickness along its full surface.

Figure 7:
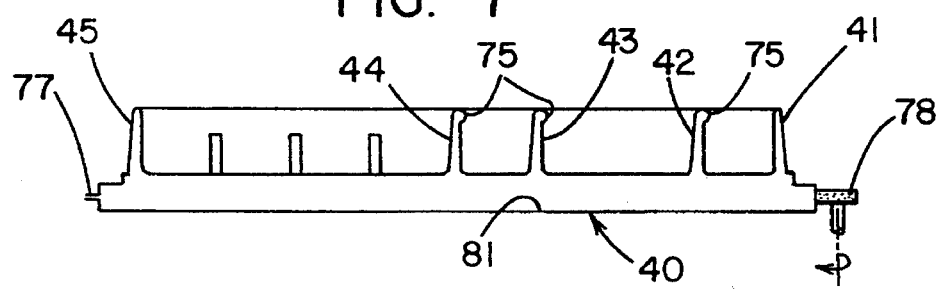
FIG. 7 is a diagrammatic view of the finished product with the flashing being removed.
Figure 8:
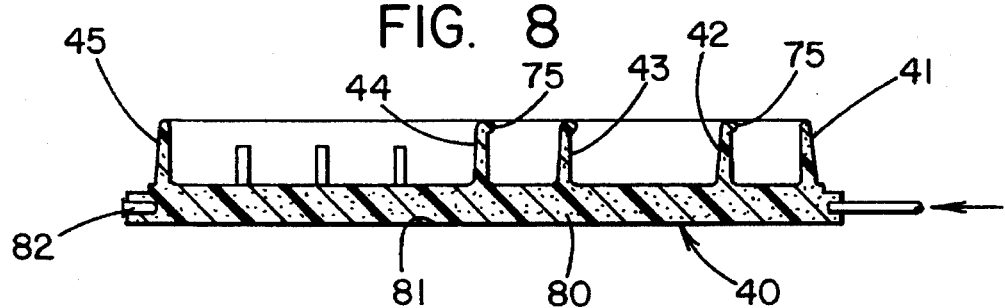
FIG. 8 is a diagrammatic cross sectional view of the finished product, a refrigerator door, being filled with foam insulation.
Figure 9:
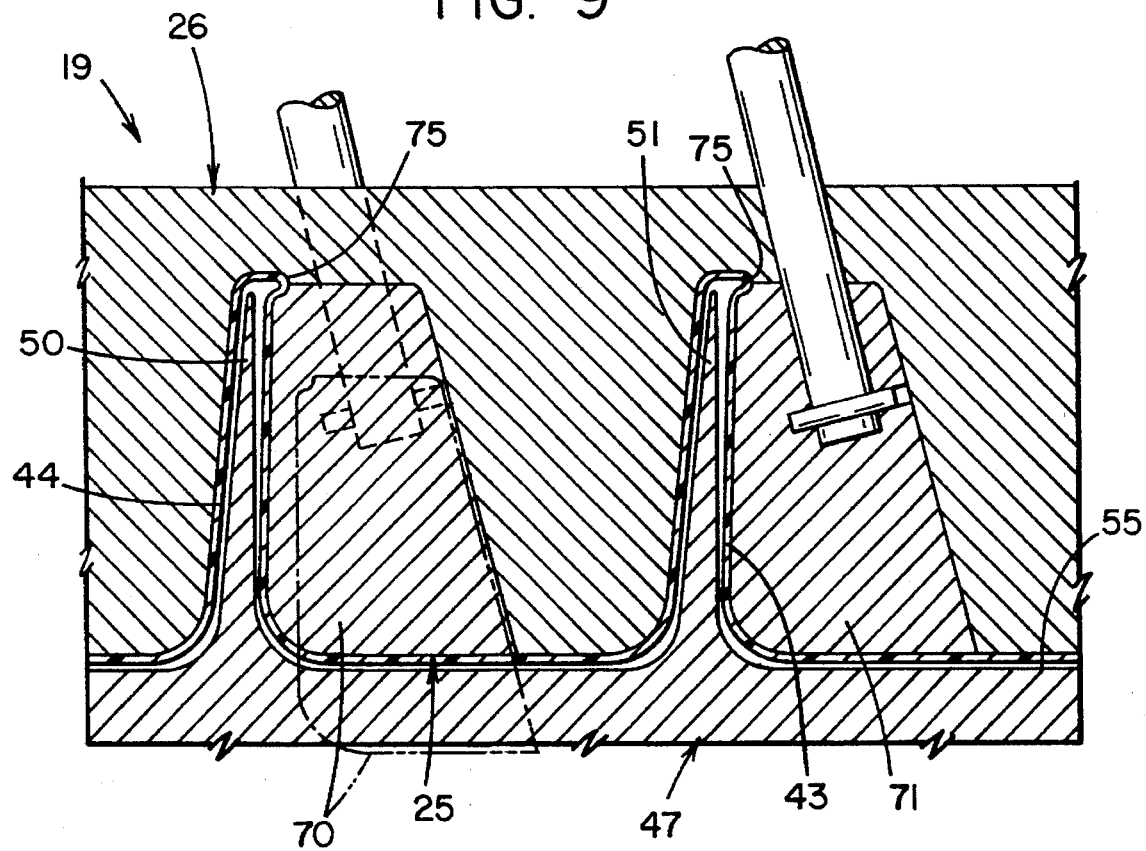
FIG. 9 is an enlarged cross sectional view of a portion of the top male mold and plug mold illustrating a pair of movable sections in the male mold that facilitate the removal of the inner liner upon completion of the molding operation.
Figure 10:
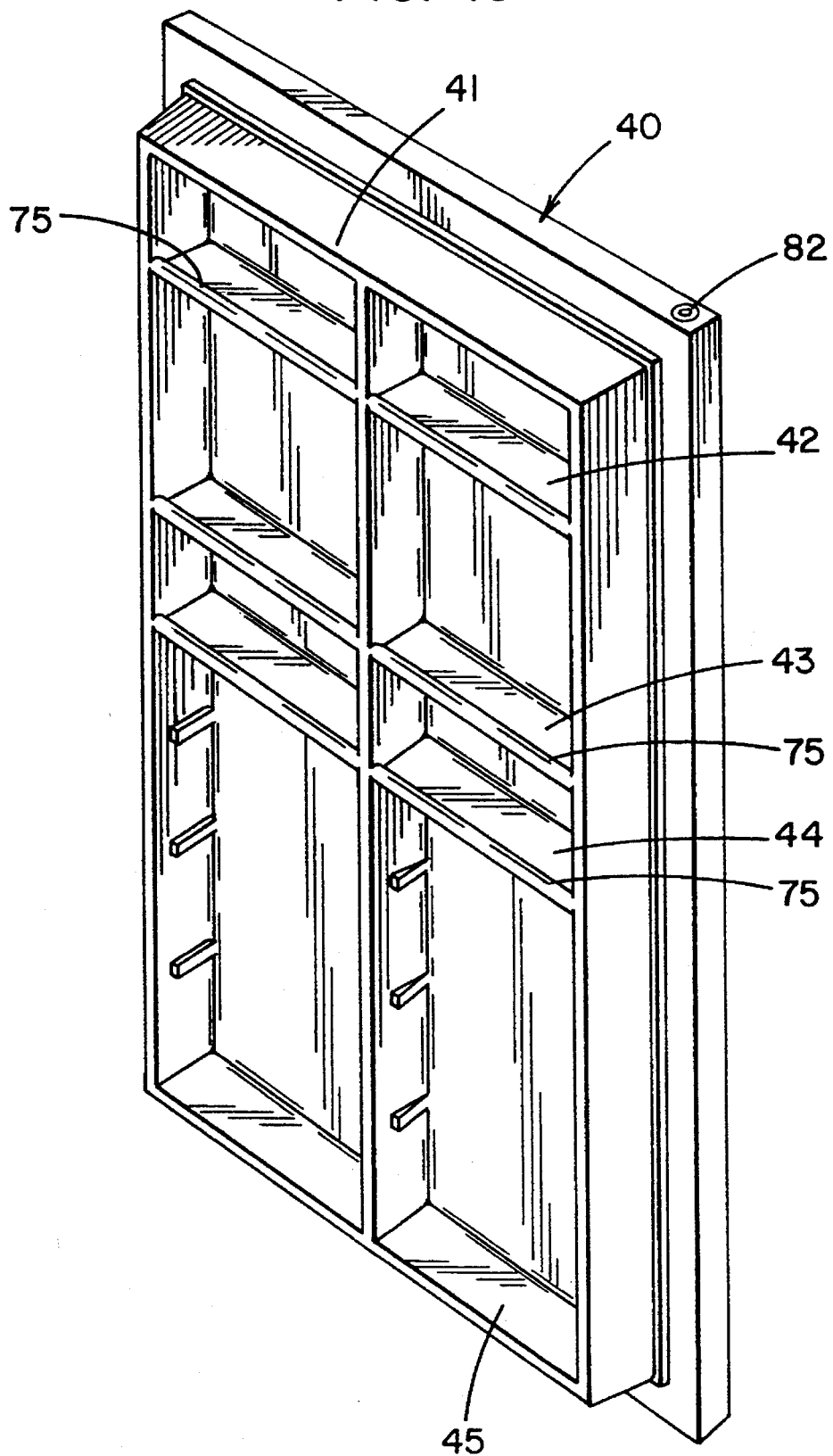
FIG. 10 is an isometric view of a finished refrigerator door.
Figure 11:
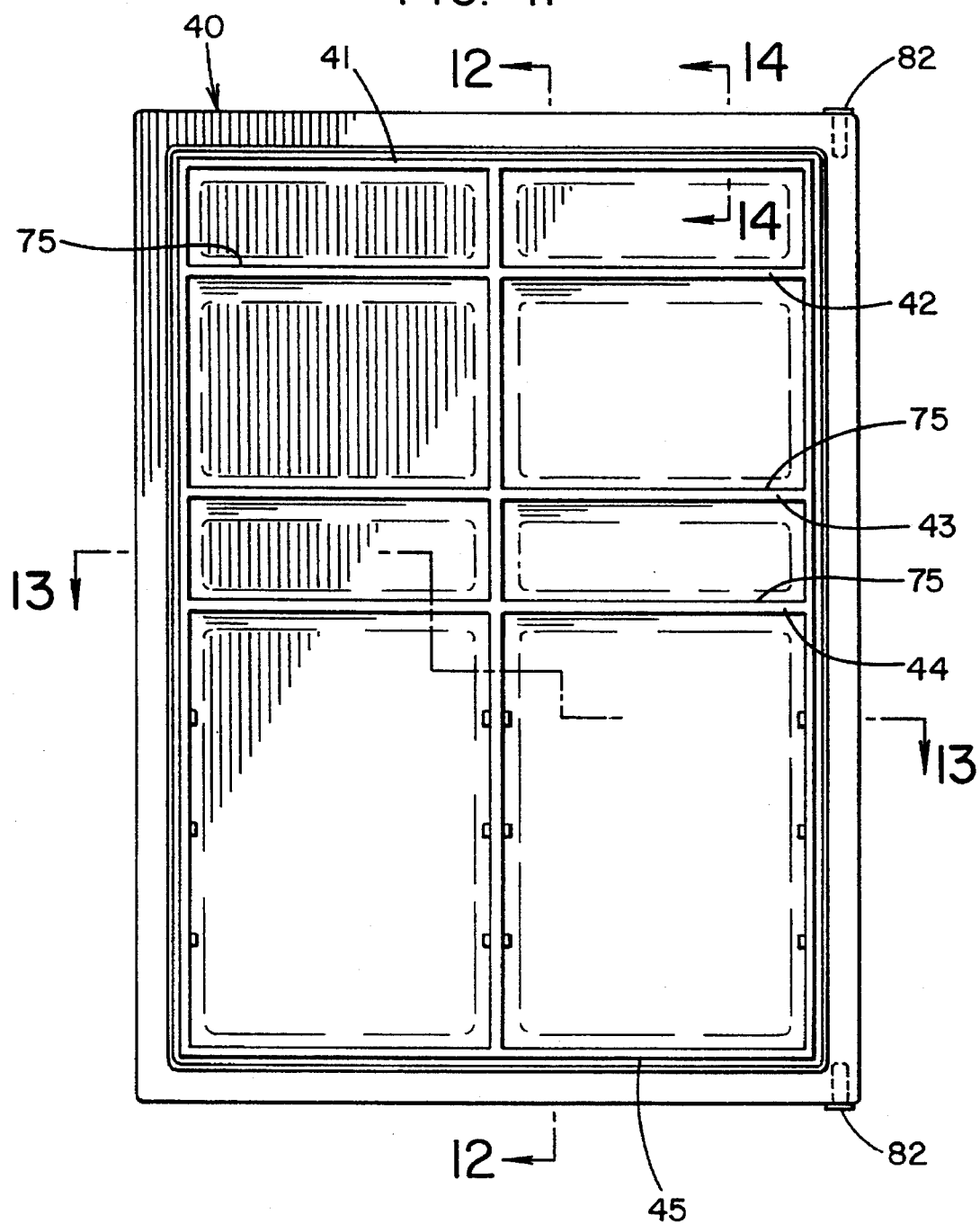
FIG. 11 is a front elevational view of a refrigerator door showing the inner liner.
Figure 12:
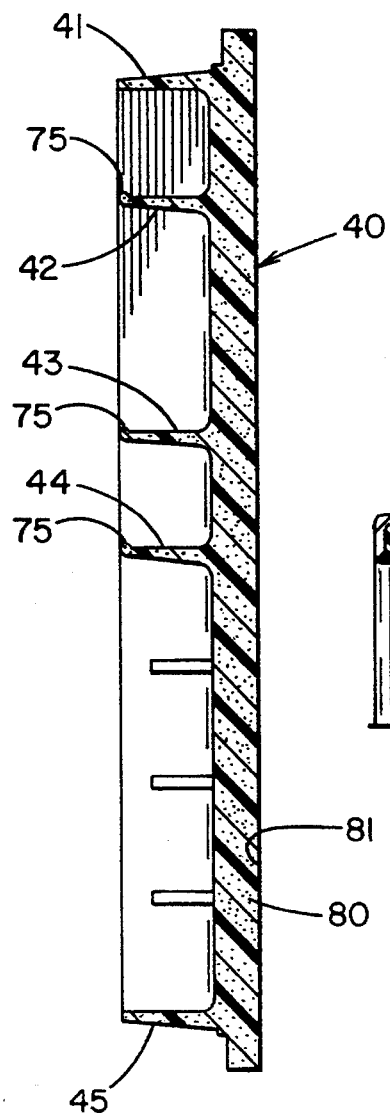
FIG. 12 is a cross sectional view of the refrigerator door taken on line 12—12 of FIG. 11.
Figure 14:
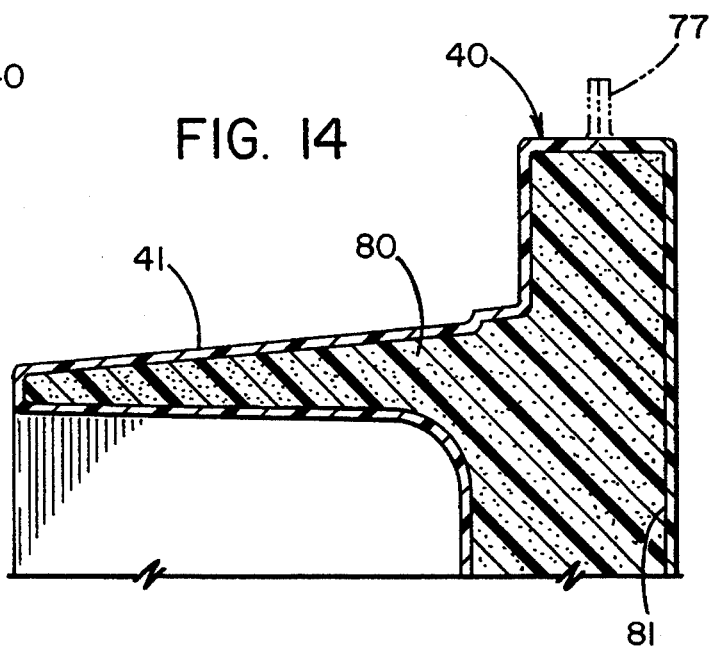
FIG. 14 is a cross sectional view of the refrigerator door taken on line 14—14 of FIG. 11.
Figure 13:
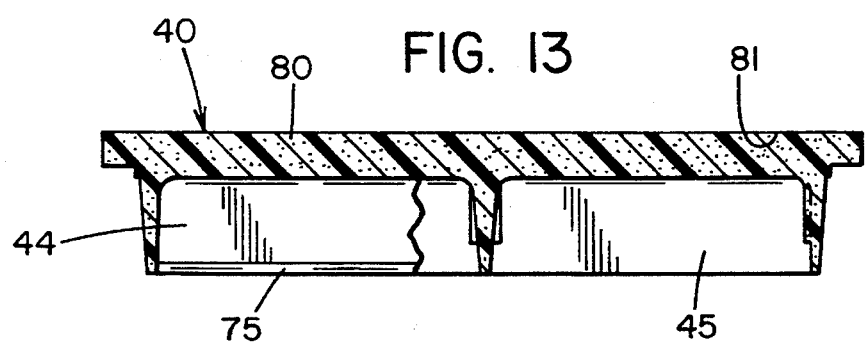
FIG. 13 is a cross sectional view of the refrigerator door taken on line 13—13 of FIG. 11.

Upon completion of the transfer of the plastic sheet 60, female plug assist mold 47 is then moved laterally out of alignment between upper male mold 26 and lower female mold 20 to the position shown in FIGS. 5A and 2A. The respective molds 26 and 20 then preheat the perimeters of their molds as depicted by resistance wires 65 and 66, respectively, in FIG. 6B. Sufficient pressure on the perimeter of sheets 60 and 61 by the respective molds 26 and 20 effects the fusion bonding of the sheets or panels 60 and 61 into an integral door as depicted by FIG. 10. The door 40 is then chilled in the molds by the circulation of coolant into suitable passageways in molds 20 and 26. To effect removal of the upper mold 26 from the formed door 40, mold 26 has a power cylinder 67 secured thereto with its piston rods 68 secured to a bracket 69 so that upon raising or retraction of the mold 26 by power means 28, the rod end of cylinder 67 remains pressurized so that mold sections 70, 71 and 72 remain in their lowered position. This action allows the lips 75 (FIG. 6B) on ribs 42, 43 and 44 to remain undisturbed until mold 26 is sufficiently raised to facilitate the removal of the door 40. After removal of this door from the molds the flashing 77 along the perimeter of the door is suitably removed as by suitable cutting or grinding means 78 as depicted in FIG. 7. A hole is then drilled through the wall of the door and foam insulation 80 is introduced into the cavity 81 of the door as depicted by FIG. 8. Suitable hinge means 82 are then installed on the completed door 40.

Various modifications are contemplated and may obviously be resorted to by those skilled in the art without departing from the described invention, as hereinafter defined by the appended claims, as only a preferred embodiment thereof has been disclosed.

We claim:

1. A process for thermoforming a refrigerator door in a molding apparatus using inner and outer plastic sheets, said inner sheet forming the interior door surface and said outer sheet forming the exterior door surface, said molding apparatus includes a means for transporting the sheets, a preheated, interior plug assist mold mounted on means for moving said mold in and out of the work area, said plug assist mold is made with a low heat transfer material, a interior upper male mold containing peripheral resistance wire, a exterior lower female mold containing peripheral resistance wire; said interior upper male mold being movably mounted on guide bars; said exterior female mold has a flat surface and a raised outer peripheral portion; each of said plug assist mold and said interior male mold contain raised peripheral portions and narrow ribs extending outwardly; said process comprises the steps of:

preheating said inner and said outer sheets, positioning said outer sheet across said exterior lower female mold, positioning said inner sheet across said interior plug assist mold, pulling a full vacuum on said outer sheet and pulling a partial vacuum on said inner sheet, said partial vacuum on said inner sheet being sufficient to only partially draw said inner sheet over said narrow ribs of said interior plug assist mold, positioning said interior plug assist mold directly beneath said interior upper male mold, pulling a full vacuum in said upper male mold, thereby transferring said inner sheet to said interior upper male mold, moving said plug assist mold away from the work area, joining said inner and said outer formed sheets at the raised peripheral portions and fusing said sheets only at said raised peripheral portions to form a continuous closed chamber between said inner and said outer sheets.

2. A process for thermoforming a refrigerator door as set forth in claim 1 wherein all of said molds are preheated prior to receiving said plastic sheets.

3. A process for thermoforming a refrigerator door as set forth in claim 1 wherein said formed refrigerator door is cooled and removed from said molds, and said closed chamber of said refrigerator door is thence filled with insulation.

* * * * *